(12) United States Patent
Albostan

(10) Patent No.: US 12,420,910 B2
(45) Date of Patent: Sep. 23, 2025

(54) TRIM TAB CONTROL

(71) Applicant: TUSAS-TURK HAVACILIK VE UZAY SANAYII ANONIM SIRKETI, Kahramankazan/Ankara (TR)

(72) Inventor: Onur Albostan, Kahramankazan/Ankara (TR)

(73) Assignee: TUSAS- TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 61 days.

(21) Appl. No.: 18/694,368

(22) PCT Filed: Jun. 28, 2022

(86) PCT No.: PCT/TR2022/050674
§ 371 (c)(1),
(2) Date: Mar. 21, 2024

(87) PCT Pub. No.: WO2023/055320
PCT Pub. Date: Apr. 6, 2023

(65) Prior Publication Data
US 2024/0400196 A1    Dec. 5, 2024

(30) Foreign Application Priority Data
Sep. 29, 2021   (TR) ............................... 2021/015234

(51) Int. Cl.
*B64C 13/18*   (2006.01)
(52) U.S. Cl.
CPC ..................... *B64C 13/18* (2013.01)
(58) Field of Classification Search
CPC ........... B64C 13/18; B64C 5/02; B64D 43/00; B64D 43/02
See application file for complete search history.

(56) References Cited

U.S. PATENT DOCUMENTS 2,464,629 A * 3/1949 Young .................... G05D 1/044
                                                    244/179
2,584,261 A * 2/1952 Davis ........................ G09B 9/16
                                                    318/560
(Continued)

FOREIGN PATENT DOCUMENTS

EP        0410162 A1    1/1991
EP        0488428 A2    6/1992
EP        0742142 A2    11/1996

OTHER PUBLICATIONS

Jayaraman et al, G. Simulation Analysis of a Pitch Trim Actuator, Google Scholar, 2013 IEEE Transportation Electrification Conference and Expo (ITEC), Jun. 2013, pp. 1-6. (Year: 2013).*

(Continued)

*Primary Examiner* — Russell Frejd
(74) *Attorney, Agent, or Firm* — Notaro, Michalos & Zaccaria P.C.

(57) ABSTRACT

A sensor unit located on an air vehicle enables the measurement of air speed, engine torque and lateral acceleration of the air vehicle. A flight control computer enables a first adjustment command to be generated using the air speed and engine torque data measured by the sensor unit. A controller run in the flight control computer enables a second adjustment command to be generated using the lateral acceleration data. A gain coefficient of the controller is determined by the flight control computer based on the air speed measured by the sensor unit. The flight control computer collects the first adjustment command and the second adjustment command is generated by the controller so that it generates a final adjustment command.

9 Claims, 2 Drawing Sheets

(56) References Cited

U.S. PATENT DOCUMENTS

| | | | | |
|---|---|---|---|---|
| 4,648,569 A | * | 3/1987 | Stewart | B64C 13/16 340/967 |
| 2010/0078518 A1 | * | 4/2010 | Tran | G05D 1/0066 701/4 |
| 2010/0163670 A1 | * | 7/2010 | Dizdarevic | B64U 20/77 244/36 |
| 2013/0345907 A1 | | 12/2013 | Meret | |
| 2014/0067168 A1 | * | 3/2014 | Tran | G05D 1/0066 701/3 |

OTHER PUBLICATIONS

Reilly et al, P. Achieving Automated Rotor Track and Balance through use of Active Trim Tab and Pitch Control Rod Technologies, Google Scholar, AIAA SciTech Forum, Jan. 2019, pp. 1-14. (Year: 2019).*

International Search Report for PCT application No. PCT/TR2022/050674, mailed Mar. 11, 2023.

Written Opinion of the International Examining Authority and Reply for PCT application No. PCT/TR2022/050674, mailed Jul. 28, 2023.

International Preliminary Examination Report for PCT application No. PCT/TR2022/050674, completed Oct. 5, 2023.

\* cited by examiner

TRIM TAB CONTROL

The present invention relates to a function in an automatic rudder trim system, which enables order of feedback controller gains to be adapted to generate appropriate trim commands according to the maneuvering situation of air vehicles.

Conditions that occur in directional axis such as torque effect and propeller effect in air vehicles require the pilot to constantly make re-adjustments by a secondary trim tab control located on the rudder. Manual re-adjustments by the pilot with the pedal then causes what is called negative training in pilots. For this reason, automatic rudder/yaw trim systems have been developed. With automatic trim systems, a trim map embedded in flight control computer automatically generates the appropriate trim command according to the specified conditions, and an angle of slip is re-adjusted with the command transmitted to the secondary trim tab.

European patent document EP0410162, which is included in the known-state of the art, discloses operation of a rudder trim system. A secondary trim tab articulated to a rudder in a propeller aircraft provides maintenance of flight direction when changing flight speed or engine power. The trim system developed for this comprises a trim motor to rotate the secondary trim tab; connecting rods for actuating the trim motor; an air speed sensor to determine the aircraft's air speed; and a torque sensor to measure torque at the propeller shaft. According to the air speed and propeller torque data measured by the air speed sensor and torque sensor, the trim flap is automatically rotated to a required position by the trim motor by means of an electronic control device. Thus, a trim flap deflection angle or a rotation angle, $\alpha$, is assigned, which corresponds to each flight speed and three different engine outputs, I, II and III.

With a trim tab control according to the present invention, generation of a trim command by the pilot is not required. By adjusting the gain coefficient of the controller, reverse slip by the air vehicle in stationary, semi-active or active states is prevented, and a trim command is generated according to the maneuver of the air vehicle.

The trim tab control realized to achieve the object of the invention and defined in the first claim and the claims dependent thereon enables measurement of a speed, engine torque and lateral acceleration data of an air vehicle by means of a sensor unit provided in the air vehicle, wherein the trim tab control comprises a flight control computer that generates a first adjustment command using the air speed and engine torque values measured by the sensor unit. The first adjustment command is the trim map command automatically generated by the flight control computer using air speed and engine torque, wherein unit of the first adjustment command can be preferably in degrees. The controller gain coefficient corresponding to the lateral acceleration data measured by the sensor unit is determined in the flight control computer by methods such as look-up tables, graphics, and matrix predetermined by the user, or by statistical calculations based on the lateral acceleration data measurement value, so that a second adjustment command is generated. Unit of the second adjustment command in the flight control computer, which is generated by the controller and for which the gain coefficient is determined, can be preferably in degrees. The first adjustment command and the second adjustment command are collected in the flight control computer, resulting in the generation of a final adjustment command, preferably in degrees. The final adjustment command determines angle of rotation of the secondary trim tab articulated on the rudder, which allows the yaw angle to be adjusted while manufacturing the air vehicle. The secondary trim tab rotates around an axis on which it is articulated to the rudder, and performs this movement when an actuator, to which the flight control computer transmits the final adjustment command, is triggered.

The trim tab control according to the invention enables detection of a changing air vehicle speed by a change in the first adjustment command value, in conditions such as sudden gassing by the pilot, maneuvering of the air vehicle, or aerobatics. Thus, a gain coefficient for the controller is determined according to the detected amount of change in the speed of the air vehicle and the instantaneous air speed value measured by the sensor unit. Since the gain coefficient of the controller generating the second adjustment command is evaluated in the flight control computer for the conditions such as sudden gassing, maneuvering or aerobatics, such that the gain coefficient is determined, conditions such as the reverse slip by the air vehicle can be prevented. The second adjustment command generated by the controller and determined by the gain coefficient, the amount of change in the first adjustment command and the measured air speed is collected in the flight control computer together with the first adjustment command, so that the final adjustment command generated is transmitted to an actuator and the secondary trim tab on the rudder is triggered by the actuator according to the final adjustment command so as to rotate around an axis thereof. In this way, the air vehicle is prevented from slipping since an automatic trim command is generated in each of the conditions as maneuvering, aerobatics, sudden gassing and cruising at constant speed.

In an embodiment of the invention, the trim tab control calculates the change in the first adjustment command in the flight control computer throughout the flight, and compares the amount of instantaneous change in the adjustment command calculated by break points predetermined by the user, thus detecting that the air vehicle performs a stationary movement at a constant speed, performs a dynamic movement such as rapid acceleration, braking, aerobatics or maneuvering, or performs a semi-dynamic movement in between. The gain coefficient is adjusted for the controller that generates the second adjustment command based on the detected dynamic, semi-dynamic or stationary movement of the air vehicle and the air speed measured by the sensor unit. Thus, according to the break points, the gain coefficient is adapted for the controller in the conditions of the air vehicle such as maneuvering, aerobatics, sudden gassing and cruising at constant speed, so that the automatic trim command, which is the final adjustment command, is generated and the air vehicle is prevented from slipping in each maneuvering condition.

In an embodiment of the invention, the trim tab control comprises at least a first opening located on a bracket to enable the belt elements to be attached to the brackets by means of mechanical fasteners such as screws or bolts, wherein the first opening has a thread structure corresponding the fasteners. Further, at least a second opening of suitable size for the fastener to pass through is provided on the belt element. The bracket and belt element are mounted by aligning the first opening and the second opening so as to overlap each other, and passing the fastener therethrough by the operator.

In an embodiment of the invention, the trim tab control receives the first adjustment command value as a feedback, which is the command of the trim map created with the air speed and engine torque values. The first adjustment command is passed through a rate limiter that provides delay and amplitude reduction in the signal in order to model the actuator in the flight control computer, and then, it is passed through a high-pass filter such that the output is reduced between 0 and 1 according to the change in the signal. If the value is negative, an absolute value of the signal is taken and a positive value is obtained. Comparison of the first command value, for which the absolute value is obtained by means of break points predetermined by the user between 0 and 1 according to the air vehicle type by passing the first command value through the rate limiter and high-pass filter, is performed in the flight control computer to determine whether the air vehicle is in a dynamic, a semi-dynamic or a stationary state. If value of the first adjustment command, for which the absolute value is taken after being passed through the rate limiter and high-pass filter, approaches zero, the air vehicle is determined to move at a constant speed or with a little speed change, that is, it is in a stationary state; if said value approaches one, it is determined that sudden changes in the speed of the air vehicle are intermittent or continuous, that is, it is moving under dynamic conditions such as sudden gassing, aerobatics, or maneuvering. Thus, the first adjustment command is passed through the rate limiter and high-pass filter in the flight control computer to obtain the absolute value thereof in order to generate the second adjustment command by the controller, the value obtained from the last signal for which the absolute value is taken is instantly compared with the break points so as to determine the maneuver of the air vehicle, and the gain coefficient is adapted according to the detected maneuver and instantaneous air speed data.

In an embodiment of the invention, if the value from 0 to 1 obtained after calculating the absolute value of the first adjustment command passed through the rate limiter and the high-pass filter falls between the break points predetermined by the user, the trim tab control enables that a linear interpolation is performed in the flight control computer for the first adjustment command value, which has been passed through the rate limiter and high-pass filter to obtain the absolute value, and that the gain coefficient for the controller is determined according to the value obtained by linear interpolation and the air speed value measured by the sensor unit. Thus, if the first adjustment command falls between the break points, the gain coefficient is adapted for a precision controller and the second adjustment command is generated.

In an embodiment of the invention, the trim tab control comprises the controller handling lateral acceleration, the type of which can be any of P, I, PI, PD or PID.

In an embodiment of the invention, the trim tab control comprises rotation of the secondary trim tab around the rudder to which it is attached, by means of at least one connection rod, when the secondary trim tab is triggered by the actuator, either hydraulic, pneumatic, or electric.

In an embodiment of the invention, the trim tab control comprises an engine power management unit for measuring engine torque data; an air data computer for measuring air speed; and an inertial measurement unit for measuring lateral acceleration data. The engine power management unit, the air data computer and the inertial measurement unit are located within the sensor unit.

In an embodiment of the invention, the trim tab control prevents the slip caused by asymmetry in case of an engine failure in mechanical twin-engine airplanes, since an automatic final adjustment command is generated, or prevents situations such as torque effect or propeller effect in turboprop airplanes.

In an embodiment of the invention, the trim tab control enables that the first adjustment command of the trim map is passed through the rate limiter to model the actuator and through the high-pass filter to obtain the change in signal in the flight control computer, that the absolute value of the first adjustment command is obtained so that the obtained value is not negative, thereby obtaining a value between 0 and 1 (I), wherein the first adjustment command is obtained with the air speed and engine torque data to adapt the gain coefficient of the controller generating the second adjustment command. After the first adjustment command is filtered through the rate limiter and high-pass filter and the absolute value thereof is taken, break points between 0 and 1 are obtained, which are predetermined by the user according to the aircraft type and correspond to the instantaneously changing value between 0 and 1 (II). Dynamic, semi-dynamic and stationary conditions of the air vehicle are determined according to the break point such that, for situations approaching zero, the air vehicle is determined to be cruising at a constant speed or with little speed change, and for situations approaching one, the air vehicle is determined to change the speed instantaneously or constantly, thus making dynamic maneuvers or sudden gassing and braking. A look-up table corresponding to the varying air speed and gain coefficient for each break point is obtained by the user or the flight control computer according to previous flight data (III). If a value between break points is obtained after the first adjustment command is passed through the rate limiter and high-pass filter and its absolute value is taken, a linear interpolation is made for the data for which the absolute value is taken, so that a look-up table is created in the flight control computer for the variable air speed and gain coefficient (IV). The gain coefficient corresponding to the measured air speed value allows the controller to determine the amplitude of the second adjustment command measured using the horizontal acceleration data (V), which optimizes the minimization of the slip angle without causing reverse slip in all maneuvering conditions.

The trim tab control realized to achieve the object of the present invention is illustrated in the attached drawings, in which.

Figure 1:
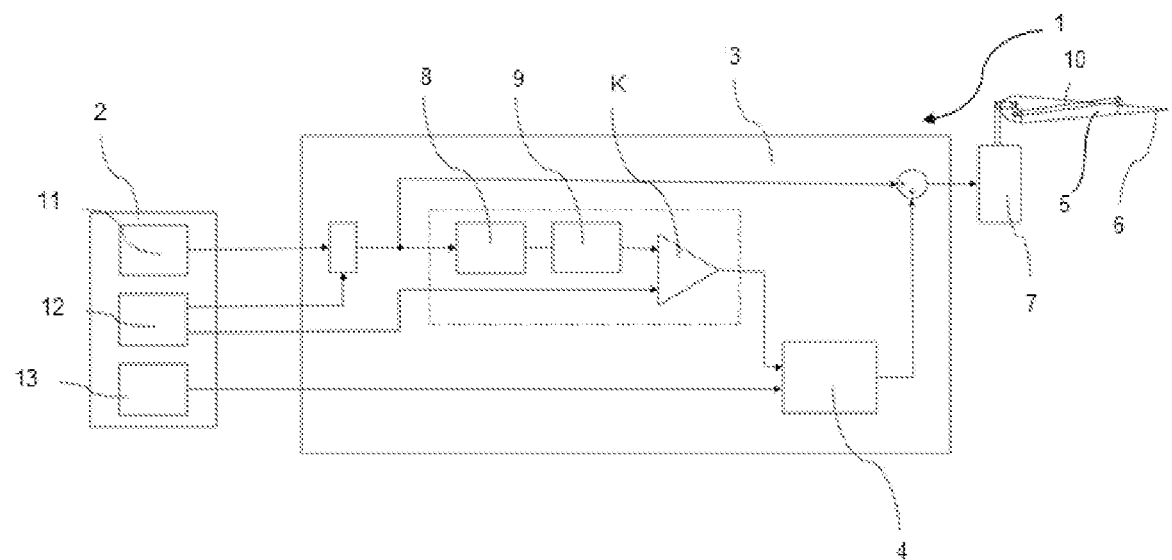
FIG. 1 is a block diagram of a trim tab control.

All the parts in the figures are individually assigned a reference numeral and the corresponding terms of these numbers are listed as follows:

1. Trim Tab Control
2. Sensor Unit
3. Flight Control Computer
4. Controller
5. Rudder
6. Secondary Trim Tab
7. Actuator
8. Rate limiter
9. High-Pass Filter
10. Connection Rod
11. Engine Power Management Unit
12. Air Data Computer
13. Inertial Measurement Unit
    (F) First Adjustment Command
    (S) Second Adjustment Command
    (TC) Final Adjustment Command
    (K) Gain Coefficient The trim tab control (1) comprises a sensor unit (2) located on an air vehicle, which enables the measurement of air speed, engine torque and lateral acceleration of the air vehicle; a flight control computer (3) which enables a first adjustment command (F) to be generated using the air speed and engine torque data measured by the sensor unit (2); a controller (4) run in the flight control computer (3), which enables a second adjustment command (S) to be generated using the lateral acceleration data, wherein gain coefficient (K) of the controller (4) is determined by the flight control computer (3) based on the air speed measured by the sensor unit (2), wherein the flight control computer (3) collects the first adjustment command (F) and the second adjustment command (S) generated by the controller (4), such that it generates a final adjustment command (TC); a rudder (5) located on the air vehicle; a secondary trim tab (6) located on the rudder (5), which moves in a rotatable manner according to the final adjustment command (TC) transmitted; an actuator (7) that enables the secondary trim tab (6) to be moved by rotating around the axis to which it is attached to the rudder (5).

The trim tab control (1) according to the invention comprises the flight control computer (3) which detects a change in speed of the air vehicle according to the amount of change in the value of the first adjustment command (F), and enables determination of the gain coefficient (K) of the second adjustment command (S) generated by the controller (4) to prevent reverse-slip by the air vehicle according to the detected change in the speed and the air speed value measured by the sensor unit (2).

By means of the sensor unit (2) provided in the air vehicle, the air speed and engine torque data for the air vehicle are measured from the physical environment and interpreted. The trim map is created by processing the air speed and engine torque data in the flight control computer (3), and output of the trim map generates the first adjustment command (F). The lateral acceleration data measured by the sensor unit (2) is transmitted to the controller (4) located in the flight control computer (3), and gain coefficient (K) of the controller (4) is determined in the flight control computer (3) via the air speed data instantaneously measured by the sensor unit (2), so that the second adjustment command (S) is generated by the controller (4). By using the first adjustment command (F) and the second adjustment command (S), statistical or arithmetic processes are performed in the flight control computer (3) so as to generate the final adjustment command (TC). The final adjustment command (TC) generated by the flight control computer (3) as an automatic trim command is transmitted to the actuator (7), which enables the secondary trim tab (6) articulated on the rudder (5) of the air vehicle to rotate around an axis to which it is attached.

Figure 2:
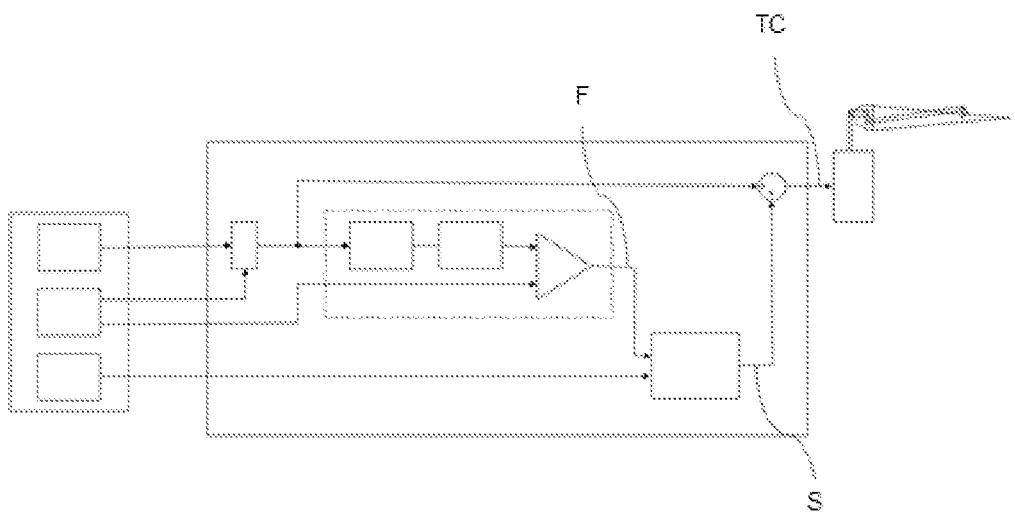
FIG. 2 is a block diagram of a trim tab control.

The first adjustment command (F) created on the trim map is transmitted to the controller (4) as a feedback and the amount of change in the first adjustment command (F) enables the speed change of the air vehicle to be detected during maneuvering. By using the first adjustment command (F), speed change of the air vehicle is detected, and the level of gain coefficients (K) is determined according to the detected speed change. The gain coefficient (K) for the controller (4) is determined by using the air speed data instantaneously measured by the sensor unit (2), so that the determined gain coefficient (K) causes the use of low-level gain coefficients (K) when the speed change increases, and the high-level gain coefficients (K) when the speed change decreases. The gain coefficient (K) levels can be determined according to the maneuver performed by the air vehicle by using the first adjustment command (F), while the gain value can be determined within the gain coefficient (K) levels according to the instantaneously measured air speed. With the selection of the gain coefficient (K) performed in two stages, the gain coefficient (K) is adapted according to the flight modes, thus minimizing the slipping without reverse slipping by the air vehicle for each maneuver. As the measured air speed increases, the gain coefficient (K) value decreases. Statistical or arithmetic processes are performed in the flight control computer (3) by using the second adjustment command (S) and the first adjustment command (F) generated by adapting the gain coefficient (K), so that the final adjustment command (TC) is generated. The final adjustment command (TC) generated by the flight control computer (3) as an automatic trim command is transmitted to the actuator (7), which enables the secondary trim tab (6) articulated on the rudder (5) of the air vehicle to rotate around an axis to which it is attached (FIG. 1, FIG. 2).

In an embodiment of the invention, the trim tab control (1) comprises the flight control computer (3) which detects whether the air vehicle performs dynamic, semi-dynamic or stationary movement according to the break points predetermined by the user for the amount of change in the first adjustment command (F) values, and determines the gain coefficient (K) of the second adjustment command (S) generated by the controller (4) according to the measured air speed for the detected movement. The first adjustment command (F) is received as a feedback by the controller (4) and the value of the first adjustment command (F) changes in proportion to the change in the speed of the air vehicle. An angle value of the first adjustment command (F) is one of degrees, grads or radians; however, the angle value is preferably generated in degrees. The break points predetermined by the user and the instantaneous changes in the first adjustment command (F), obtained throughout the flight, are compared in the flight control computer (3). When the amount of change in the first adjustment command (F) approaches the break point determined for the dynamic flight of the air vehicle, the break point determined for the semi-dynamic flight, or the break point determined for the stationary flight, it is determined that the air vehicle is cruising at a constant speed, with little speed change, with too much speed change or with many speed changes in a short time. During dynamic flight of the air vehicle, speed change occurs too much or too often, that is, sudden gassing-braking, maneuvering or aerobatics processes are performed by the air vehicle. During stationary flight of the air vehicle, little speed change or constant speed is realized. Thus, gain coefficient (K) of the controller (4) is automatically adapted for the dynamic, semi-dynamic or stationary conditions of the air vehicle, so that slippage is minimized for each flight mode without reverse slipping and the second adjustment command (S) is generated through this gain coefficient (K). An angle value of the second adjustment command (S) is one of degrees, grads or radians; however, the angle value is preferably generated in degrees.

Figure 3:
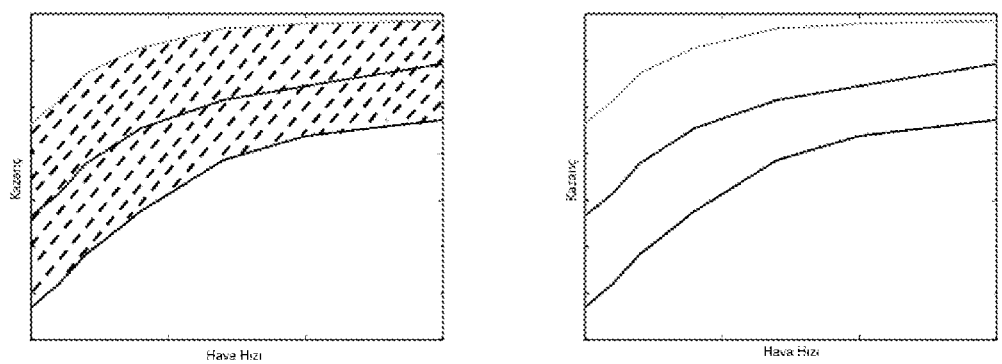
FIG. 3 is a graph illustrating the gain coefficient.

In an embodiment of the invention, the trim tab control (1) comprises the flight control computer (3) which enables calculation of the change in the value of the first adjustment command (F) since the first adjustment command (F) is passed through a rate limiter (8) and a high-pass filter (9) to generate the second adjustment command (S) adapted to the maneuver of the air vehicle. The first adjustment command (F) is passed through the rate limiter (8) to model the actuator (7) in the flight control computer (3), so that the delay time effect is taken into account. Then, the first adjustment command (F) is passed through the high-pass filter (9) located in the flight control computer (3), so that the change in the signal is detected. By taking the absolute value of the obtained signal, the output is enabled to be reduced between 0 and 1. When the change in the first adjustment command (F) is large, that is, when the air vehicle makes sudden gassing-braking, maneuvers or in case of aerobatic situations, absolute value of the output of the high-pass filter (9) approaches one, and when the change is small, that is, in cases where the air vehicle moves at a constant speed or with very little speed change, absolute value of the output of the high-pass filter (9) approaches zero. Therefore, by using the first adjustment command (F), the speed change of the air vehicle and the movement of the air vehicle are determined (FIG. 3).

In an embodiment of the invention, the trim tab control (1) comprises the flight control computer (3) which, if the change value calculated after the first adjustment command (F) is passed through the rate limiter (8) and the high-pass filter (9) falls between the break points, makes a linear interpolation for the calculated change value, and determines the gain coefficient (K) corresponding to the measured air speed according to the value obtained by interpolation. After the first adjustment command (F) is passed through the rate limiter (8) and high-pass filter (9), the absolute value thereof is taken to reduce it to a value between 0 and 1; absolute value of the output of the high-pass filter (9) approaches one when the air vehicle is in dynamic flight; and absolute value of the output of the high-pass filter (9) approaches zero when the air vehicle is in stationary flight. Flight mode of the air vehicle is determined according to the break points predetermined by the user; however, if absolute value of the output of the high-pass filter (9) falls between the break points, linear interpolation is applied to this value in the flight control computer (3). The gain coefficient (K) for the instantaneously measured air speed is determined from the look-up table for air speed and gain coefficient (K) corresponding to the value obtained by linear interpolation, so that the second adjustment command (S) is generated with this control gain (K). Therefore, the gain coefficients (K) are selected with high or low values according to the maneuvers performed by the air vehicle, and it is ensured that the air vehicle minimizes the slip without performing reverse slip under each maneuvering condition. The look-up table is a database created in the flight control computer (3) based on previous flight data.

In an embodiment of the invention, the trim tab control (1) comprises the controller (4) which is one of the P, I, PI, PD or PID. The controller (4) enables generation of the second adjustment command (S) by using the lateral acceleration data.

In an embodiment of the invention, the trim tab control (1) comprises at least one connection rod (10) triggered by the actuator (7) so as to cause the secondary trim tab (6) to rotate around the yaw axis of the air vehicle. Motion transfer is provided by at least one connection rod (10) for trimming the air vehicle in the yaw axis by triggering the secondary trim tab (6) by a hydraulic, pneumatic or electric actuator (7). Thus, the actuator (7) enables the secondary trim tab (6) to rotate around the axis to which it is attached to the rudder (5), by means of the connection rods (10).

In an embodiment of the invention, the trim tab control (1) comprises an engine power management unit (11) located in the sensor unit (2), which enables engine torque data to be obtained; an air data computer (12) which enables air speed to be obtained; an inertial measurement unit (13) which enables lateral acceleration data to be obtained. The engine power management unit (11), the air data computer (12) and the inertial measurement unit (13), which are called the sensor unit (2), provide the data required for the generation of the final adjustment command (TC) to be measured from the physical environment. The engine power management unit (11) enables the engine torque data to be obtained, the air data computer (12) enables the air speed to be obtained, and the inertial measurement unit (13) enables the lateral acceleration to be obtained.

In an embodiment of the invention, the trim tab control (1) comprises the trim tab control (1) suitable for use in mechanical twin-engine airplanes and turboprop airplanes. The trim tab control (1) is activated to enable generation of the final adjustment command (TC) in the event of an engine failure in twin-engine mechanical airplanes, or to enable generation of the final adjustment command (TC) for performing automatic trim in turboprop airplanes in situations such as torque effect, propeller effect, slipstream.

In an embodiment of the invention, the trim tab control (1) comprises the flight control computer (3) which enables the steps of:
  adapting the gain coefficient (K) for the controller (4);
  passing the first adjustment command (F) through the rate limiter (8) and the high-pass filter (9) (I);
  determining the break points previously by the user according to the amount of change in the first adjustment command (F) obtained by being passed through the rate limiter (8) and the high pass filter (9) (II);
  creating an air speed and gain coefficient (K) look-up table for each user-specified break points (III);
  making linear interpolation to the change value in the first adjustment command (F) passed through the rate limiter (8) and high-pass filter (9), which is between the break points, so that an air speed and gain coefficient (K) look-up table is created for the obtained value (IV);
  determining gain coefficient (K) for the second adjustment command (S) generated by the controller (4) using the horizontal acceleration data according to the measured air speed (V). The first adjustment command (F) is passed through the rate limiter (8) representing the actuator (7) in the flight control computer (3), and then passed through the high-pass filter (9) to generate delta representing the differences in the signal (I). By taking the absolute values of the deltas, positive discrete time data or continuous signal is obtained. The obtained values are between 0 and 1, and the obtained value is compared with the break points between 0 and 1, which were previously determined by the user according to the air vehicle type, so that the speed change depending on the maneuver of the air vehicle is determined (II). The gain coefficients (K) levels change according to each break point, wherein a look-up table for varying air speed and gain coefficient (K) values for each level is created by the user in the flight control computer (3) beforehand (III). If the value, which is obtained after passing the first adjustment command (F) through the rate limiter (8) and the high-pass filter (9) take the absolute value thereof, falls between the break points, linear interpolation is applied by the flight control computer (3) and the gain coefficient (K) level is determined (IV). After applying linear interpolation to the value having intermediate levels, the gain coefficient (K) is determined according to the instantaneously measured air speed value. Adaptation of the gain coefficient (K) for the second adjustment command (S) measured by the controller (4) is provided by determining the level with the first adjustment command (F) and selecting the instantaneously measured air speed and the gain coefficient (K) value (V) (FIG. 3).

The invention claimed is:

1. A trim tab control (1) comprising:
    a sensor unit (2) located on an air vehicle which enables the measurement of air speed, engine torque and lateral acceleration of the air vehicle;
    a flight control computer (3) s configured to enable a first adjustment command (F) to be generated using the air speed and engine torque data measured by the sensor unit (2);
    a controller (4) wherein gain coefficient (K) of the controller (4) is determined by the flight control computer (3) based on the air speed measured by the sensor unit (2);
    a rudder (5) located on the air vehicle;
    a secondary trim tab (6) located on the rudder (5) which moves in a rotatable manner according to the final adjustment command (TC) transmitted;
    an actuator (7) that enables the secondary trim tab (6) to be moved by rotating around the axis to which it is attached to the rudder (5); and
    wherein the controller (4) run in the flight control computer (3), which is configured to enable a second adjustment command(S) to be generated using the lateral acceleration data, wherein the flight control computer (3) collects the first adjustment command (F) and the second adjustment command(S) generated by the controller (4), such that it generates a final adjustment command (TC), and wherein the flight control computer (3) is configured to detect a change in speed of the air vehicle according to the amount of change in the value of the first adjustment command (F), and enable determination of the gain coefficient (K) of the second adjustment command(S) generated by the controller (4) to prevent reverse-slip by the air vehicle according to the detected change in the speed and the air speed value measured by the sensor unit (2).

2. The trim tab control (1) according to claim 1, wherein the flight control computer (3) is configured to detect whether the air vehicle performs dynamic, semi-dynamic or stationary movement according to the break points predetermined by the user for the amount of change in the first adjustment command (F) values, and to determine the gain coefficient (K) of the second adjustment command(S) generated by the controller (4) according to the measured air speed for the detected movement.

3. The trim tab control (1) according to claim 1, wherein the flight control computer (3) is configured to enable calculation of the change in the value of the first adjustment command (F) since the first adjustment command (F) is passed through a rate limiter (8) and a high-pass filter (9) to generate the second adjustment command(S) adapted to the maneuver of the air vehicle.

4. The trim tab control (1) according to claim 3, wherein the flight control computer (3) which, when the change value calculated after the first adjustment command (F) is passed through the rate limiter (8) and the high-pass filter (9) falls between the break points, is configured to make a linear interpolation for the calculated change value, and determines the gain coefficient (K) corresponding to the measured air speed according to the value obtained by interpolation.

5. The trim tab control (1) according to claim 3, wherein the flight control computer (3) is configured to perform the steps of:
    adapting the gain coefficient (K) for the controller (4);
    passing the first adjustment command (F) through the rate limiter (8) and the high-pass filter (9) (I);
    determining the break points previously by the user according to the amount of change in the first adjustment command (F) obtained by being passed through the rate limiter (8) and the high pass filter (9) (II);
    creating an air speed and gain coefficient (K) look-up table for each user-specified break points (III);
    making linear interpolation to the change value in the first adjustment command (F) passed through the rate limiter (8) and high-pass filter (9), which is between the break points, so that an air speed and gain coefficient (K) look-up table is created for the obtained value (IV); and
    determining gain coefficient (K) for the second adjustment command(S) generated by the controller (4) using the horizontal acceleration data according to the measured air speed (V).

6. The trim tab control (1) according to claim 1, wherein the controller (4) is one of the P, I, PI, PD or PID.

7. The trim tab control (1) according to claim 1, comprising at least one connection rod (10) that is riggered by the actuator (7) so as to cause the secondary trim tab (6) to rotate around the yaw axis of the air vehicle.

8. The trim tab control (1) according to claim 1, comprising:
    an engine power management unit (11) located in the sensor unit (2) configured to enable engine torque data to be obtained;
    an air data computer (12) that enables air speed to be obtained; and
    an inertial measurement unit (13) that enables lateral acceleration data to be obtained.

9. The trim tab control (1) according to claim 1, wherein the trim tab control (1) is for use in mechanical twin-engine airplanes and turboprop airplanes.

* * * * *